United States Patent
Krell et al.

(10) Patent No.: US 10,108,528 B2
(45) Date of Patent: Oct. 23, 2018

(54) HIGH-PERFORMANCE PROCESSOR INSTRUCTION TRACING

(71) Applicant: Microsoft Technology Licensing, LLC, Redmond, WA (US)

(72) Inventors: Jay Krell, Renton, WA (US); HoYuen Chau, Bellevue, WA (US); Allan James Murphy, Woodinville, WA (US); Danny Chen, Woodinville, WA (US); Steven Pratschner, Duvall, WA (US); Hoi Huu Vo, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/249,245

(22) Filed: Aug. 26, 2016

(65) Prior Publication Data

US 2018/0060212 A1    Mar. 1, 2018

(51) Int. Cl.
*G06F 9/44* (2018.01)
*G06F 11/36* (2006.01)

(52) U.S. Cl.
CPC ................. *G06F 11/3636* (2013.01)

(58) Field of Classification Search
None
See application file for complete search history.

(56) References Cited

U.S. PATENT DOCUMENTS

| | | | |
|---|---|---|---|
| 4,598,364 A | 7/1986 | Gum et al. | |
| 6,223,338 B1 | 4/2001 | Smolders | |
| 7,047,521 B2 | 5/2006 | Bunnell | |
| 7,137,105 B2 | 11/2006 | Madsen et al. | |
| 7,284,153 B2 | 10/2007 | Okbay et al. | |
| 7,313,734 B2 | 12/2007 | DeWitt, Jr. et al. | |
| 8,832,682 B2 | 9/2014 | Xu et al. | |
| 2003/0135789 A1* | 7/2003 | DeWitt, Jr. | G06F 11/3466 714/38.13 |
| 2003/0204374 A1* | 10/2003 | Madsen | G06F 11/3466 702/186 |
| 2005/0060521 A1 | 3/2005 | Wang | |
| 2005/0223364 A1* | 10/2005 | Peri | G06F 11/3636 717/128 |
| 2013/0305099 A1* | 11/2013 | Ionescu | G06F 11/348 714/45 |

OTHER PUBLICATIONS

AnandK, "Microsoft Time Travel Tracing Diagnostic Tool," thewindowsclub.com, Jul. 21, 2013, 7 pages.

(Continued)

*Primary Examiner* — Daxin Wu
(74) *Attorney, Agent, or Firm* — Klarquist Sparkman, LLP

(57) ABSTRACT

High-performance tracing can be achieved for an input program having a plurality of instructions. Techniques such as executable instruction transcription can enable execution of a plurality of instructions at a time via a run buffer. Execution information can be extracted via run buffer execution. Fidelity of execution can be preserved by executing instructions on the target processor. Other features, such as an executable extraction instruction ensemble, branch interpretation, and relative address compensation can be implemented. High quality instruction tracing can thus be achieved without the usual performance penalties.

16 Claims, 8 Drawing Sheets

(56) References Cited

OTHER PUBLICATIONS

"Time Travel Tracing Diagnostic," Microsoft Support, support.microsoft.com, Jun. 4, 2013, 9 pages.
Wynnell, "Time Travel Tracing?" OSRonline.com, Feb. 10, 2007, 9 pages.
"UndoDB," http://undodb.io, visited Aug. 3, 2016, 7 pages.
Undo Manpage (undodb-gdb), Aug. 2, 2016, undo-software.com, 12 pages.
Ankerholz, "New Version of UndoDB Released," *Linux Magazine*, Jun. 14, 2012, 5 pages.
Bhansali, "Instruction-level Tracing: Framework & Applications," PowerPoint presentation with notes, Binary Technologies Group, Microsoft, Nov. 3, 2005, 33 pages.
"Most data references in x64 are RIP-Relative," Nyaeve: Adventures in Windows debugging and reverse engineering, www.nynaeve.net, Nov. 2007, 2 pages.
"LEA—Load Effective Address," faydoc.tripod.com, visited Aug. 8, 2016, 2 pages.
Bhansali et al., "Framework for Instruction-level Tracing and Analysis of Program Executions," *VEE'06*, Jun. 14-16, 2006, Ottawa, Ontario, Canada, pp. 154-163.

\* cited by examiner

HIGH-PERFORMANCE PROCESSOR INSTRUCTION TRACING

BACKGROUND

Tracing execution of software is an important part of the software development process and can provide a variety of useful information for improving software. For example, as software becomes more complex, it becomes ever more challenging to preserve acceptable performance. An important part of improving the performance of a software program is program tracing. Tracing allows developers to retrace a program's steps. In practice, automated tools can analyze program traces and provide performance-related information to developers, who can then address performance problems or otherwise enhance performance.

However, tracing execution is not a simple matter. Observing the execution of a program tends to alter its execution or slow it down dramatically. Some high quality hardware-based instruction tracing solutions are available, but limitations in performance make such solutions impractical, especially for software of any significant size or complexity.

There is therefore room for improvement.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

In one embodiment, a method comprises, for an input program comprising executable instructions, transcribing a plurality of the executable instructions into a run buffer, wherein the transcribing generates a transcribed executable instruction based on an original executable instruction of the input program; and executing the run buffer, wherein executing the run buffer comprises extracting execution information for the transcribed executable instruction in the run buffer, recording the execution information for the transcribed execution information for the transcribed executable instruction, and executing the transcribed executable instruction.

In another embodiment, a computing system comprises one or more hardware processors; and an instruction tracer receiving an input program and generating an execution log, wherein the instruction tracer comprises a run buffer and transcribes a plurality of executable instructions of the input program into the run buffer, injects an executable address extraction instruction into the run buffer, and executes the run buffer; wherein the executable address extraction instruction extracts an address of a memory access by a transcribed executable instruction when executed, and the address is recorded in the execution log.

In another embodiment, one or more computer-readable media comprise computer-executable instructions that when executed cause a computing system to perform a method comprising receiving an input program comprising executable instructions comprising memory access instructions, branch instructions, and other instructions; transcribing a plurality of the executable instructions into a run buffer wherein the plurality of executable instructions comprise a particular memory access instruction; injecting an executable extraction instruction ensemble into the run buffer, wherein injecting the ensemble comprises (a)-(c): (a) injecting one or more executable memory address extraction instructions based on the particular memory access instruction into the run buffer, wherein the executable memory address extraction instructions extract a memory location accessed by the particular memory access instruction; (b) injecting one or more executable pre-extraction instructions before the executable memory address extraction instructions into the run buffer, wherein the executable pre-extraction instructions preserve processor state; and (c) injecting one or more executable post-extraction instructions after the executable memory address extraction instructions into the run buffer, wherein the executable post-extraction instructions save the extracted memory location and restore processor state; executing the run buffer, wherein executing the run buffer executes the pre-extraction instructions, the extraction instructions, the post-extraction instructions, and the particular memory access instruction, thereby extracting an address accessed by the particular memory access instruction while preserving fidelity of execution of the input program; and storing the extracted address accessed by the particular memory access instruction to a log.

As described herein, a variety of other features and advantages can be incorporated into the technologies as desired.

DETAILED DESCRIPTION

High-performance instruction tracing can be accomplished by the technologies described herein. Fidelity of execution can be preserved without unduly sacrificing performance. For example, instructions can be transcribed into a run buffer and executed as they are monitored, resulting in computationally equivalent execution of the original program that can be monitored without disrupting the fidelity of execution.

A wide variety of execution information can be logged to enable robust analysis of traced programs. Other features relating to branch interpretation, extraction instruction injection, relative addressing, and the like can be employed to accomplish the technologies as described herein.

Software development can benefit from the technologies because accurate tracing and profiling information can be collected while avoiding expending excess computing resources on tracing. Multi-threaded programs can be profiled, and interplay between or among threads can be analyzed.

Performance of developed programs can benefit as well because the technologies can be used to identify possible areas of a program for performance improvement. Memory accesses can be managed to avoid cache misses, reduce working set, and the like. Thus, computing resources can be conserved.

Therefore, overall performance of a program can be enhanced via the technologies described herein. In addition, any of a number of other uses can be applied to the generated tracing information.

Figure 1:
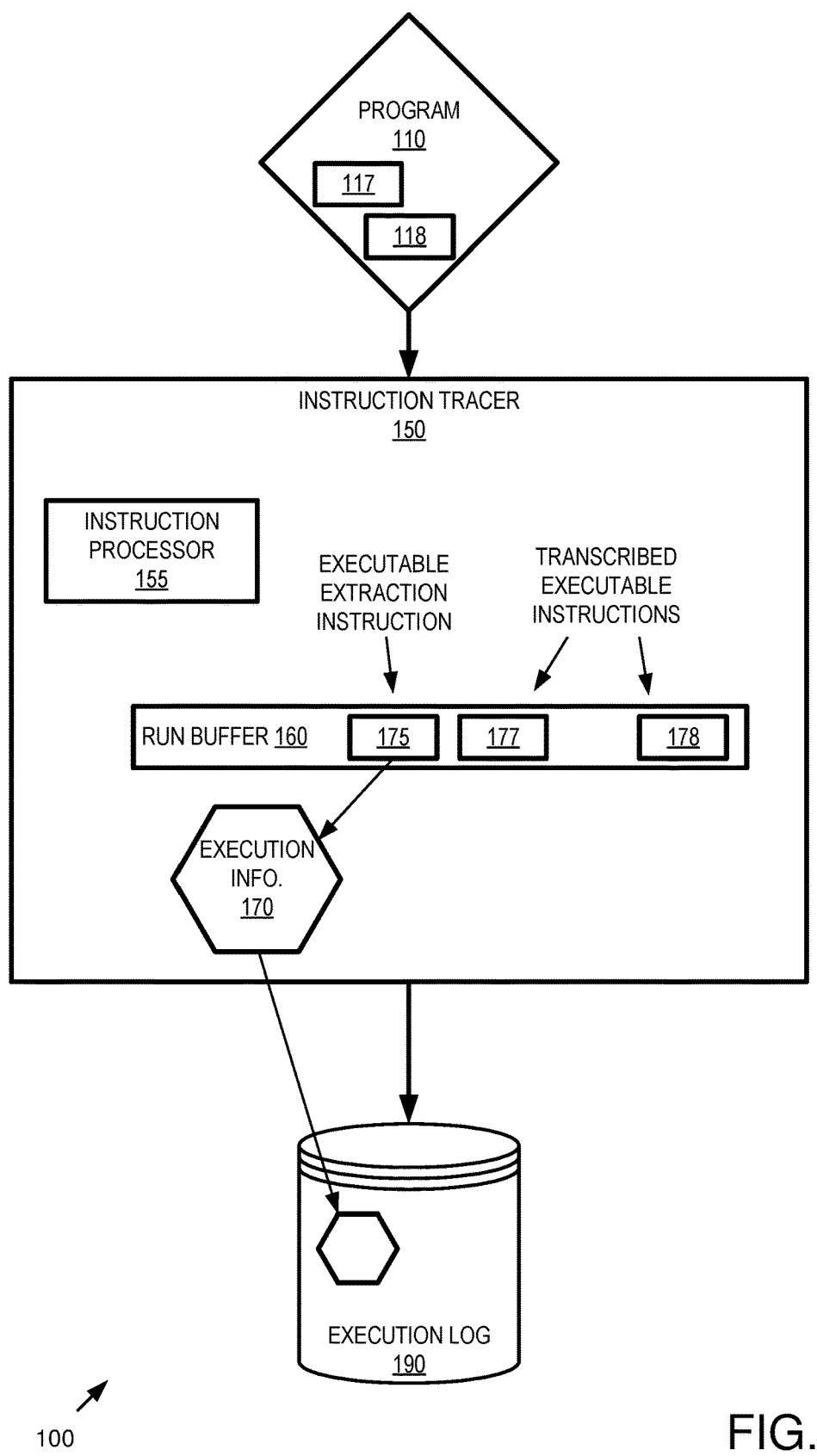
FIG. 1 is a block diagram of an example system implementing high-performance processor instruction tracing.

Example 1—Example System Implementing High-Performance Processor Instruction Tracing FIG. 1 is a block diagram of an example system 100 implementing high-performance processor instruction tracing that can be used to implement any of the examples herein.

In the example, an instruction tracer 150 receives an input program 110 comprising a plurality of executable instructions (e.g., including original instructions 117 and 118) and generates an execution log 190, that comprises a trace of the input program 110. As shown, the instruction tracer 150 can comprise a run buffer 160. The tracer 150 can transcribe a plurality of executable instructions of the input program 110 (e.g., original instructions 117, 118) to transcribed instructions 177, 178 into the run buffer 160. The tracer 150 can also inject an executable execution information extraction instruction 175 into the run buffer 160 and execute the run buffer 160. Control over execution can be recovered by placing additional instructions in the run buffer 160 that return control to the tracer 150.

The executable extraction instruction 175, when executed, extracts execution information 170, which is recorded in the log 190. For example, the instruction 175 can take the form of an executable address extraction instruction that extracts the memory address accessed by a transcribed executable instruction (e.g., corresponding to an original instruction in the program 110) when executed, and the address 170 can be recorded in the execution log 190.

A wide variety of other execution information can be monitored or extracted during tracing of the input program 110, which proceeds by loading instructions into the run buffer 160 as described herein.

As described herein, an executable extraction instruction ensemble can be injected into the run buffer 160 to extract execution information without disrupting execution.

Relative addressing can be supported as described herein so that transcription of an instruction into the run buffer 160 does not impact execution.

In any of the examples herein, although some of the subsystems are shown in a single box, in practice, they can be implemented as separate cooperating subsystems. Boundaries between the components can be varied.

In practice, the systems shown herein, such as system 100, can vary in complexity, with additional functionality, more complex components, and the like. For example, although a single instruction tracer 150 is shown, in practice, a plurality of tracers 150 can execute at a time (e.g., to trace a multithreaded program). Similarly, although only two transcribed instructions are shown in the drawing, in practice, a greater number of instructions can be transcribed. Additional components can be included to implement security, redundancy, load balancing, auditing, and the like.

The described computing systems can be networked via wired or wireless network connections. Alternatively, systems can be connected through an intranet connection (e.g., in a corporate environment, government environment, educational environment, research environment, or the like).

The system 100 and any of the other systems described herein can be implemented in conjunction with any of the hardware components described herein, such as the computing systems described below (e.g., processing units, memory, and the like). In any of the examples herein, the input program, log, run buffer, executable instructions, and the like can be stored in one or more computer-readable storage media or computer-readable storage devices. The technologies described herein can be generic to the specifics of operating systems or hardware and can be applied in any variety of environments to take advantage of the described features.

Example 2—Example Method of High-Performance Processor Instruction Tracing

Figure 2:
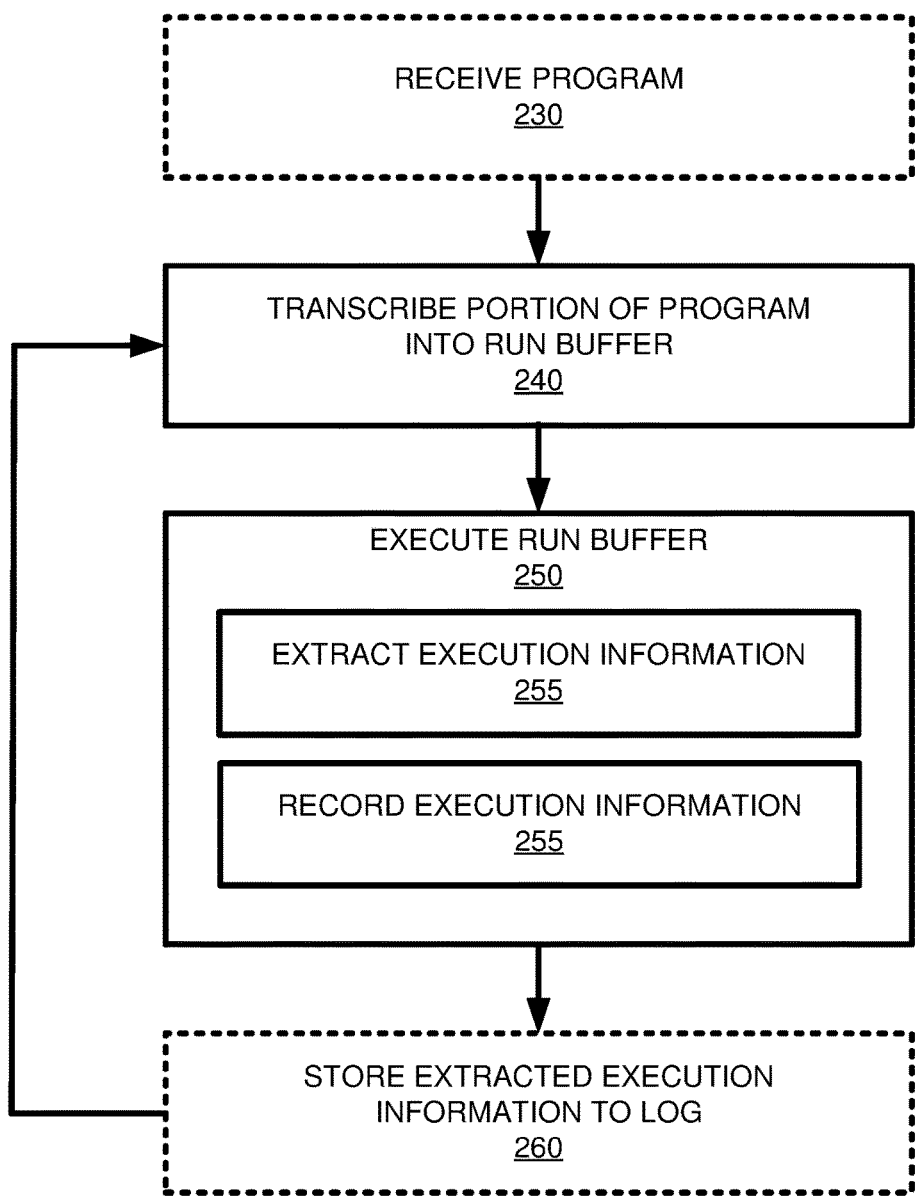
FIG. 2 is a flowchart of an example method implementing high-performance processor instruction tracing.

FIG. 2 is a flowchart of an example method 200 of implementing high-performance processor instruction tracing and can be implemented, for example, in a system such as that shown in FIG. 1. As described herein, a plurality of concurrently executing instruction tracers can be supported (e.g., for multi-threaded scenarios).

In practice, actions can be taken before tracing begins, such as determining where tracing should begin, which parts of the program to trace, and the like.

For purposes of context, the drawing shows an input program is received at 230. In practice, a reference to the program, a program address, or the like can be provided. Any number of techniques can then be used to stop execution of the program, at which point control passes from the original program to the instruction tracer.

At 240, a portion of the input program is transcribed into a run buffer. So, for a program comprising executable instructions, a plurality of the instructions are transcribed into the run buffer. Such transcribing generates a transcribed executable instruction based on an original executable instruction of the program as described herein. As described herein, more than one instruction can be transcribed into the run buffer before it is executed. Thus, more than one instruction is transcribed per execution cycle by the tracer. Additional or other actions can be taken as part of instruction processing as described herein.

At 250, the run buffer is executed. In practice, the tracer branches to the location of the run buffer, the processor executes the instructions therein (e.g., which comprise a plurality of transcribed instructions as described herein), and control eventually then returns to the tracer. Executing the run buffer achieves various tasks of the tracer. Executing the run buffer extracts execution information for the transcribed executable instruction in the run buffer, records the execution information for the transcribed executable instruction, and executes the transcribed executable instruction. As described herein, such acts can be achieved at least in part by an executable extraction instruction ensemble.

In practice, execution information is typically extracted before the transcribed executable instruction is executed. As described, the transcribed executable instruction can be executed on the target processor, resulting in a computationally equivalent execution of the input program, even while it is monitored by the tracer.

Although a hardware processor can be involved and leveraged for tracing, the tracing functionality can be centered in software as shown. Although such an approach could be implemented in hardware, typical available hardware implementations can suffer from limitations such as single instruction tracing, which exhibits poor performance.

For purposes of context, the drawing shows the extracted execution information is stored to an execution log at 260. As described herein, such information can be temporarily stored before eventually making its way to the log.

The tracer can then process another set of instructions for the program by continuing at 240 until an end condition is met.

In practice, the tracer can collect a variety of execution information, with or without need for the run buffer. For example, branch instructions can be interpreted and recorded to the log as described herein.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

In any of the technologies described herein, the illustrated actions can be described from alternative perspectives while still implementing the technologies. For example, for 230 "receive program" can also be described as "send program" for a different perspective.

Example 3—Example Execution Information

In any of the examples herein, a variety of execution information can be extracted as part of tracing. One helpful example of execution information relates to memory accesses. For example, instructions that load information from or store information to a memory location can be monitored to analyze such memory accesses. In practice, such instructions are not limited to "load" or "store" instructions because other instructions (e.g., add, compare, etc.) can also access memory.

As described herein, one or more executable extraction instructions (e.g., in an executable extraction instruction ensemble) can be used to extract execution information, including memory locations (e.g., addresses) involved in memory accesses.

Such information can then be used in a variety of techniques to improve program performance. For example, memory access characteristics can point to improvements that avoid cache misses, reduce working set, or the like.

Other execution information relates to branches in the program. Information indicating that a branch was encountered, which branch was taken, and the like can be recorded to the log. As described herein, such branching information can be collected without employing the run buffer (e.g., via interpreting the branch instruction).

Example 4—Example Instruction Transcription

In any of the examples herein, an instruction of the input program can be transcribed into the run buffer for execution. Executing the transcribed instruction by the processor can preserve execution fidelity and computational equivalence.

As described herein, some instructions can be transcribed by merely copying them into the run buffer. In some cases, an instruction can be modified (e.g., to account for relative addressing or the like).

Thus, instead of modifying the instruction stream directly, a portion of the original stream can be transcribed into the run buffer. The instructions can then be run from the buffer and analyzed by the tracer. After execution and analysis is complete, the next portion of the instruction stream can be copied into the run buffer.

Example 5—Example Executable Extraction Instruction

In any of the examples herein, an executable extraction instruction can be injected into the run buffer and extracts execution information when executed. As described herein, such an executable extraction instruction can be derived from the original instruction that is transcribed into the run buffer. Such an instruction can also be called an "executable execution information extraction instruction" because it extracts execution information as described herein when executed.

The executable extraction instruction can be an instruction that has limited effects on processor state (e.g., registers, flags, and the like). For example, such an instruction can be implemented that does not modify processor flags, the stack pointer, or the like. In this way, the limited impact on the processor state can be completely reversed and hidden while avoiding expending excess resources. Some registers, such as the instruction pointer can be changed as part of execution, but observation of the original instruction pointer values can still be achieved because of correspondence between instructions in the run buffer and the original program.

One example is an executable address extraction instruction, which can be used in any of the examples herein. When the original executable instruction loads from or stores to a memory address, extracting execution information can comprise extracting the memory address. An executable address extraction instruction, when executed, generates a memory address accessed by (e.g., if it were to be executed) the original executable instruction. For example, the address can be provided in a data register. A processor supporting an instruction that loads an address of a computed memory location can be leveraged by transforming the original instruction into a derived executable address extraction instruction that computes the memory location associated with the original instruction, which can be recorded to the execution log.

An example of such an instruction is a load-effective-address instruction, which can be derived from the original instruction of the input program and placed into the run buffer. When executed, the memory address accessed by the original instruction is computed by the process and placed in a register. The memory address can then be recorded and stored as described herein. Processor flags and the stack pointer can be unaffected by execution of the load-effective-address instruction.

Such an approach can be helpful in reducing computations carried out by the tracer. Instead, the processor itself can compute the address (e.g., in hardware), resulting in superior performance of tracing. The tracer can thus also avoid emulating some of the complexities of the underlying processor architecture.

Example 6—Example Executable Extraction Instruction Ensemble

In any of the examples herein, an executable extraction instruction (e.g., derived from the original executable instruction) can be included as part of an executable extraction instruction ensemble. Such an ensemble can also include instructions to save processor state before the extraction instruction is executed (e.g., one or more pre-extraction instructions), store the results of the extraction instruction (e.g., one or more post-extraction instructions), and restore processor state (e.g., one or more post-extraction instructions). Thus, when an executable extraction instruction ensemble is injected into the run buffer, it can perform extracting and recording tasks as described herein when executed.

Instructions to save the processor state can prepare for the effects of the extraction instruction on the processor and can be injected before the executable extraction instruction. For example, when the extraction instruction places a memory address in a register, the affected register can be temporarily stored (e.g., in a temporary processor state preservation area associated with the run buffer) by one or more pre-extraction instructions. After execution of the extraction instruction, state can be restored via one or more post-extraction instructions, which are injected after the executable extraction instructions into the run buffer.

In this way, execution of the executable extraction instructions is made transparent to the execution. In other words, the processor state (e.g., including data registers) appears to be untouched by the extraction instructions because processor state is restored to what it would have been had the extraction instructions not executed.

Example 7—Example Execution of Run Buffer

In any of the examples herein, the contents of the run buffer can be executed to accomplish tracing tasks. In practice, the tracer executes the run buffer by branching to a memory location of the run buffer (e.g., at the beginning of the run buffer, where the first instruction was processed). Thus, the instruction pointer can be changed so that the processor executes the instructions out of the run buffer. Allowing the target processor to execute the run buffer can assist in preserving fidelity and computational equivalence. As described herein, executing more than one transcribed instruction per run buffer execution can result in higher performance. In practice, a larger run buffer can result in higher performance. In some cases, the run buffer can fill before a branch instruction is encountered, and instruction processing stops until after the buffer is executed.

As described herein, instructions can be placed at the end of the run buffer to return control back to the tracer. In practice, left over space at the end of the run buffer can be filled with empty instructions (e.g., NOPs), or an injected branch in the run buffer can direct execution to the instructions at the end of the run buffer to avoid having to execute such empty instructions or change the size of the buffer.

A temporary location can be established immediately outside of the run buffer to include a temporary log and processor state preservation area. To enhance performance, the temporary location can be maintained at a constant location, even though the number of instructions in the run buffer may change over time.

Example 8—Example Processor Instructions

In any of the examples herein, processor instructions can be traced. Such processor instructions typically take the form of machine code (e.g., bytes of code that are executed by or targeted for execution on a hardware processor), but the technologies described herein can be applied to any of a variety of processor instructions. Any of a variety of processor architectures can be supported. As described herein, instructions can be divided into different instruction types to assist in processing by the tracer.

The technologies can also be applied to processor sharing systems such as virtual machines.

Example 9—Example Execution Entity

In any of the examples herein, an independent trace (e.g., log) can be generated for different execution entities (e.g., threads, cores, processes, processors, or the like).

Example 10—Example Relative Addressing

In any of the examples herein, instruction processing can support relative addressing by the instruction. In such a case, transcription of the instruction can include modifying it so that it still performs its operations on the same memory addresses. For example, a memory accessing instruction can be changed so that the same memory location is accessed, even though the instruction is moved.

So, responsive to determining that an instruction uses relative addressing, transcribing the instruction can comprise modifying it to continue to refer to the same memory location. The instruction type can be changed, and the part of the instruction that specifies what memory address is being accessed can be changed to account for the condition that the instruction is being executed at a different location than expected. For example, the offset between the original location and the transcribed location can be applied to the memory location.

Example 11—Example Use Cases

The execution logs generated by the technologies described herein can be used in a wide variety of applications. Such useful applications include identifying processor issues such as processor and memory level inefficiencies such as memory cache misses or the inefficient use of individual memory cache lines. Any number of other applications can be used such as performance analysis, profiling, debugging, bug detection, regression analysis, coverage analysis, optimization, impact analysis, usage analysis, and the like.

Performance analysis is an important part of software development, and the logs can be analyzed to detect performance issues that can be improved within the code. For example, analysis of cache misses, memory grouping, time spent in functions, and the like can be analyzed. Another example of performance analysis includes micro penalty analysis. A small inefficiency in code can add up when executed a large number of times. Because actual execution of the code is monitored, it is possible to detail execution of individual instructions or patterns of individual instructions and detect small inefficiencies in the code.

Automated tools can process execution logs to detect and identify performance issues.

Information in the logs can be further mined for a variety of purposes. For example, the logs can be combined with compilation information (e.g., symbols and the like) to reconstruct information at the source code level (e.g., a particular statement or function is generating cache misses).

Example 12—Example Method of Tracing Program

Figure 3:
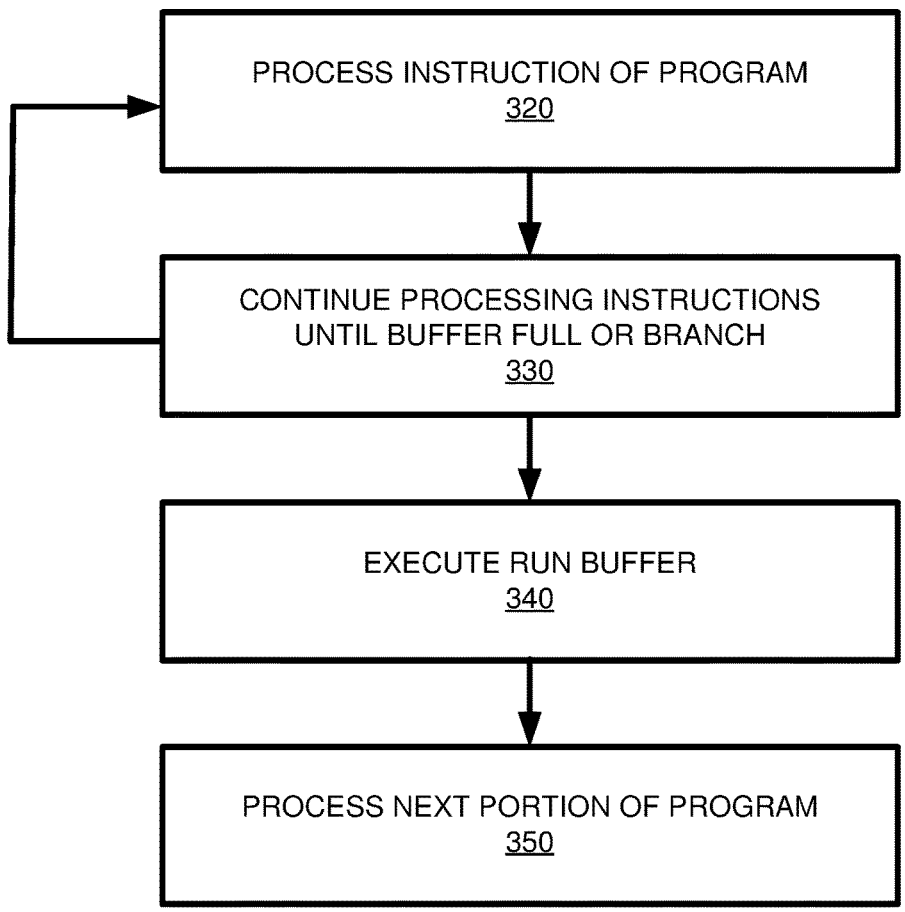
FIG. 3 is a flowchart of an example method implementing example instruction stream processing to accomplish high-performance processor instruction tracing.
Figure 3:

FIG. 3 is a flowchart of an example method 300 of tracing a program and can be implemented, for example, in a system such as that shown in FIG. 1. The method 300 can be applied to process the instructions of an input program to be traced as described herein.

At 320, an executable instruction of the input program is processed as described herein. Such processing typically includes transcribing the executable instruction but can take alternate forms as described herein (e.g., for branch instructions).

At 330, instructions continue to be processed until the run buffer is full or a branch in the program is encountered. In practice, the instructions may be of different sizes, so an instruction can be disassembled to determine its length as part of the processing as described herein.

At 340, the run buffer is executed. In practice, some additional processing can prepare the run buffer for processing. As described herein, execution of the run buffer can be accomplished by branching to a memory location of (e.g., at the beginning of) the run buffer. Execution of the run buffer can accomplish various tracing tasks as described herein as well as executing the transcribed instructions. Execution information can be stored to a log.

At 350, the next portion of the program is processed. For example, if the program branches, the location to which the program branches can be determined, and instructions can be processed. If the buffer was full, then processing can continue where it left off.

For cases in which a branch loops on instructions, the run buffer can achieve caching by leaving the run buffer unmodified.

Example 13—Example Instruction Processing

Figure 4:
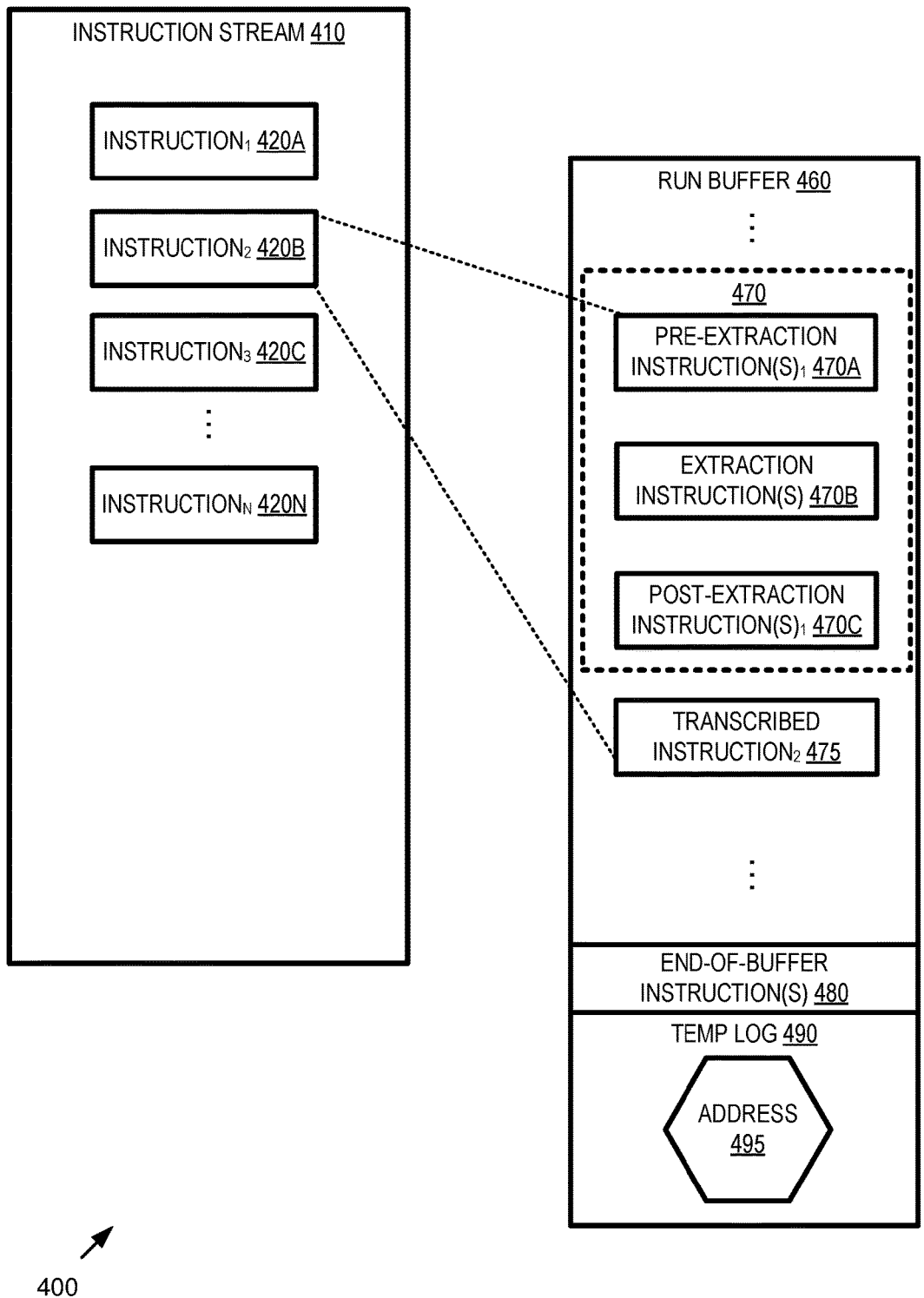
FIG. 4 is a block diagram of an example system processing an instruction stream to accomplish high-performance processor instruction tracing via a run buffer.

In any of the examples herein, executable instructions of an input program can be processed into a run buffer, which is then executed as described herein. FIG. 4 is a block diagram of an example system 400 processing an instruction stream 410 of an input program into a run buffer 460. An instruction tracer (e.g., more specifically, an instruction processor 155) of FIG. 1 can accomplish the arrangement shown in FIG. 4.

In the example, the instruction stream 410 comprises a plurality of original instructions 420A-N that are processed by the tracer.

Although different instruction types can be processed differently, the example shows processing for an instruction 420B, which results in a number of instructions 470A-C, 475 being placed into the run buffer 460 for execution. The one or more pre-extraction instructions 470A, the one or more extraction instructions 470B, and the one or more post-extraction instructions 470C can be referred to as an executable extraction instruction ensemble 470. For an ensemble that extracts an address, such an address 495 can be stored in a temporary location 490 (e.g., proximate the run buffer 460). The address can then eventually make its way to a log. Similarly, a processor state preservation portion of memory can be maintained as associated with the run buffer, and processor state can be temporarily stored to the processor state preservation portion of memory and restored at a later time.

Although the example shows only one transcribed instruction 475 in the run buffer, in practice a plurality of such instructions are typically included before the run buffer 460 is executed as described herein.

As shown, one or more end-of-buffer instructions 480 can be included to pass control of execution back to the tracer.

Example 14—Example Instruction Processing According to Instruction Type

Figure 5:
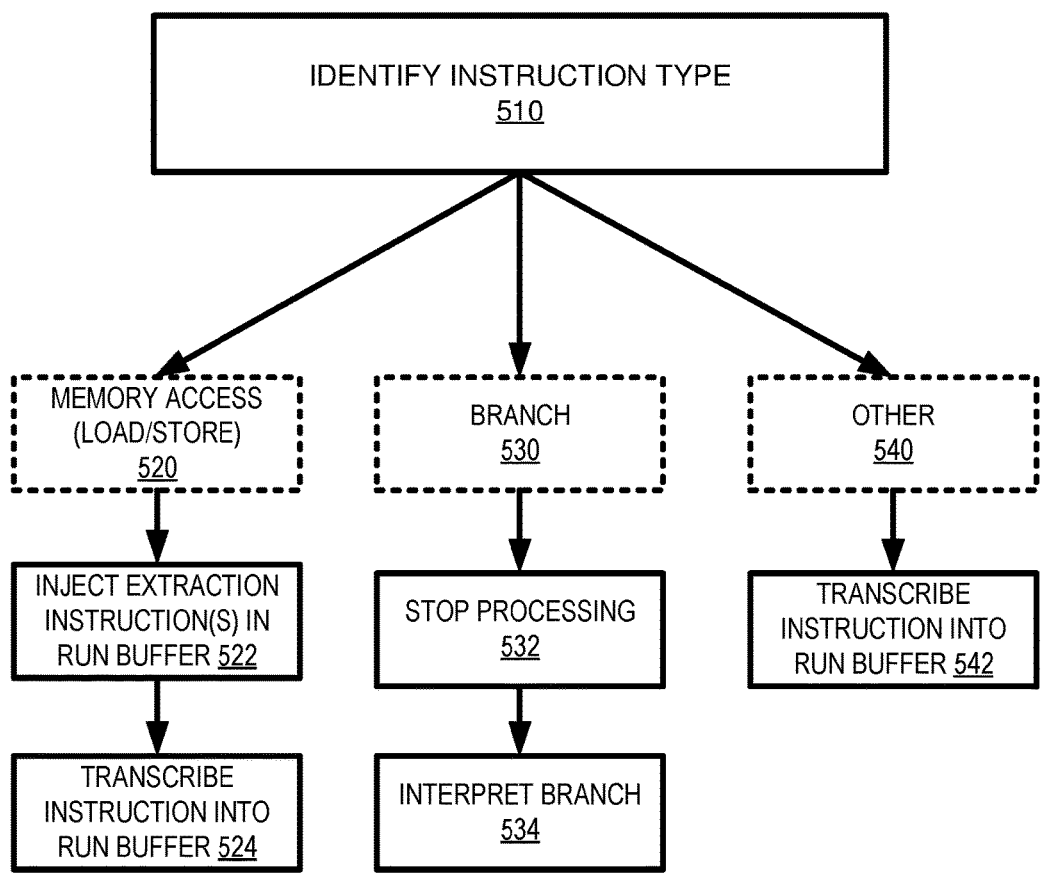
FIG. 5 is a flowchart of a method of instruction processing for different instruction types.
Figure 5:

FIG. 5 is a flowchart of a method of processing for different instruction types 520, 530, 540 and can be implemented, for example, by an instruction tracer (e.g., more specifically an instruction processor 155) as shown in FIG. 1.

At 510, the type of a particular instruction of the input program is identified. As described herein, the instruction can be disassembled to determine its type, size, and the like. In the example, three instruction types (e.g., memory access, branch, and other) are supported, but others can be implemented as desired.

At 520, responsive to determining that the instruction is a memory access instruction, an executable extraction instruction (e.g., as part of an ensemble) is injected into the run buffer 522 and the instruction is transcribed to the run buffer at 524.

At 530, responsive to determining that the instruction is a branch instruction, instruction processing is stopped at 532 (e.g., the run buffer is executed). After execution of the run buffer, the tracer can then interpret the branch at 534 and determine to where the program branches. Processing a branch instruction of the input program can also comprise recording an entry in a log indicative of the branch instruction, and directing tracing processing to the destination location.

A branch interpreter can be included in the tracer and is configured to process a branch executable instruction of the input program and redirect the instruction tracer to a branch address indicated by the branch executable instruction. Such interpretation can include disassembling the instruction and inspecting flags or registers to determine if one or more conditions specified by the branch instruction are met.

At 540, responsive to determining that the instruction is some other instruction, the instruction is transcribed into the run buffer at 542.

As described herein, multiple transcribed instructions can thus be placed into the run buffer until the buffer fills or a branch instruction is encountered. The run buffer can then be executed to accomplish tasks of the tracer. The process can be repeated until tracing is complete.

Example 15—Example Branch Instruction Processing Details

In any of the examples herein, branches can be categorized as either direct or indirect. Direct branches are instruction-pointer relative. To interpret direct branches, the value of the instruction can be added or subtracted to the instruction pointer.

The branch target for an indirect branch can be in a register or in memory. The value can be read and used to compute the branch target.

An alternative approach to computing a branch target address is to use a load-effective-address technique as described herein. Such an approach can save away the contents of an unused register, load the register with the effective address of the branch (e.g., via the load-effective-address instruction), recode the original instruction to use the register. The instruction now contains the absolute address of the branch target, and restoring the original contents of the register.

Example 16—Example Execution Control

Figure 6:
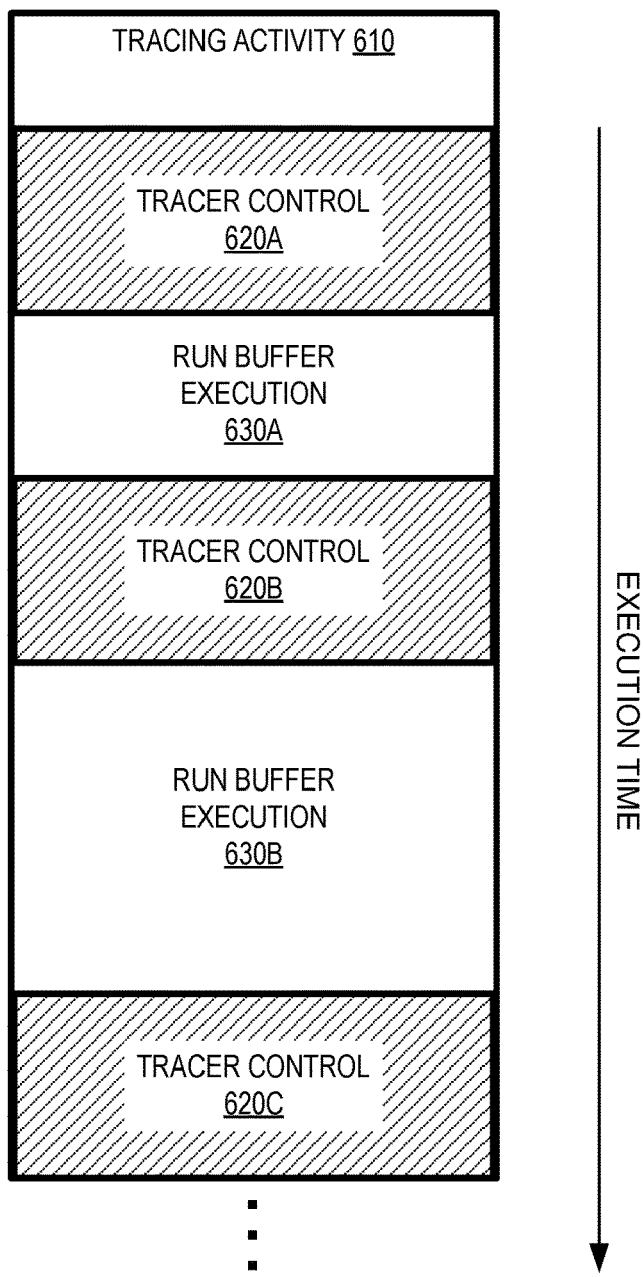
FIG. 6 is a block diagram showing alternating execution control in an instruction tracing scenario.

FIG. 6 is a block diagram showing alternating execution control in an instruction tracing scenario. In any of the examples herein, control can switch back and forth between the processor (e.g., executing the transcribed program in the run buffer) and the instruction tracer (e.g., which is typically also executed by the same processor).

In the example, tracing activity 610 can continue, even though control alternates between the tracer 620A-C and run buffer execution 630A-B. In this way, the tracer can accomplish tracing tasks by delegating them to the processor, which executes transcribed instructions and injected instructions in the run buffer.

The injected instructions can save data to a temporary area, which the instruction tracer can then retrieve and place into a log before executing the run buffer again.

Example 17—Example Address Extraction Instruction

In any of the examples herein, an address extraction instruction can take the form of a load-effective-address (e.g., LEA) instruction. Such an instruction can be generated by deriving the extraction instruction from the original instruction. Therefore, the load-effective-address instruction is based on the original executable instruction. In architectures that recognize a portion of an instruction as specifying an address (e.g., as an operand of the instruction), the portion of the original instruction specifying the address (e.g., the operand) can be included in (e.g., copied to) the derived instruction. So, the original instruction can be copied, and the opcode changed to LEA. A rex prefix byte can be used to ensure a 64-bit address is obtained for sake of consistency (e.g., the same addresses sizes are collected for different instructions) and completeness. Details concerning computing an address according to any of a plurality of addressing modes can be handled by the processor executing the load-effective-address instruction.

For example, the following original load instruction:
mov rax, [rcx+rdi]
can be used to generate the derived address extraction instruction:
lea rax, [rcx+rdi].

After the derived instruction is executed, the effective address is now contained in rax. The value from rax can be recorded to record the address accessed by the original instruction. For example, the address can be stored in a temporary log location and eventually make its way into the execution log as described herein.

Example 18—Example Logs

Figure 7:
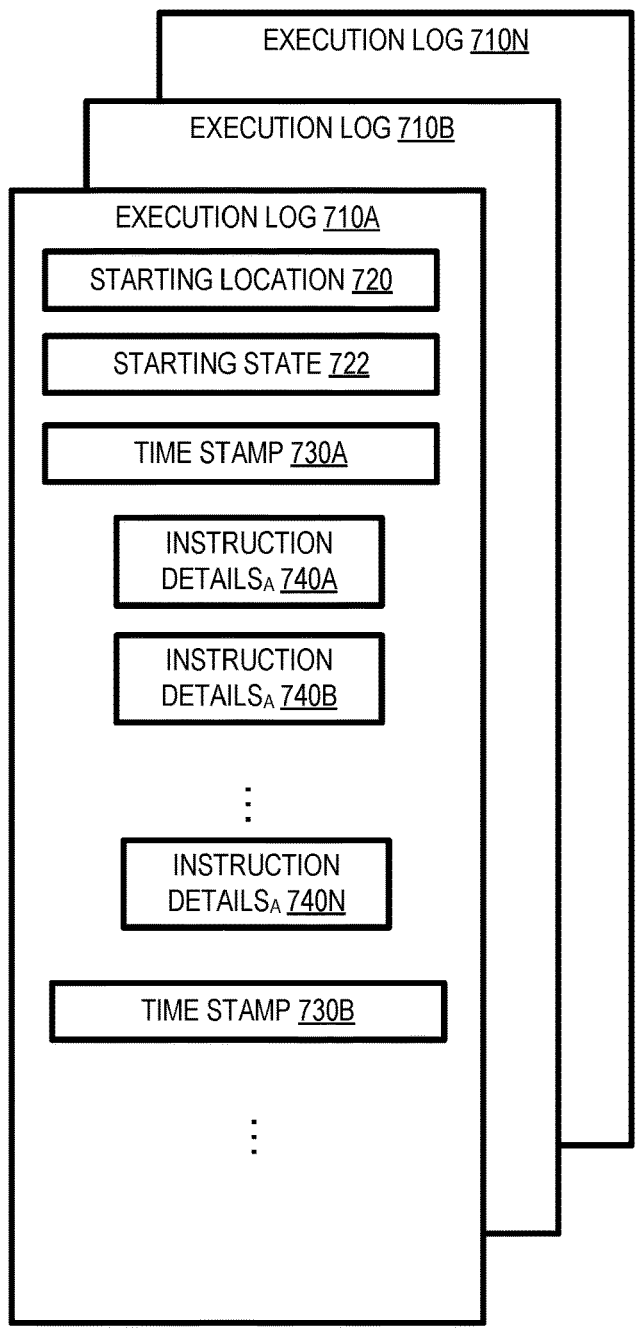
FIG. 7 is a block diagram of an example set of execution logs generated via the technologies described herein.

In any of the examples herein, an execution log can take the form of tracing information. Such information can allow replay of the execution as observed by the tracer. FIG. 7 is a block diagram of an example set of execution logs 710A-N generated via the technologies described herein. In practice, separate logs 710A-N can be generated for respective execution entities (e.g., threads or the like).

In the example, the log 710A includes a starting location 720 recording where the trace started. A starting state 722 (e.g., modules loaded or the like) can also be included.

A time stamp 730A-B can be included for various purposes (e.g., timing, determining overlap with other execution entities, etc.). To conserve storage, time stamps can be generated on an occasional basis.

Instruction details 740A-N can include a variety of execution information about executed instructions. For example, where the instruction is located, instruction type, locations in memory that are accessed by the instruction, or the like can be recorded. In practice, information can be combined into a single record and/or relative information, compressed information, or the like can be employed to reduce log size.

As described herein, branch details can also be recorded.

In practice, the information can be linked up to source code (e.g., by consulting symbol information) to provide rich analysis of which locations in source code are exhibiting particular characteristics (e.g., accessing memory in a compact block accessing memory spread out over many blocks, or the like).

The information extracted via the injected executable extraction instructions can be included in or used to include information in the log as described herein.

Example 19—Example Run Buffer Caching

In any of the examples herein, transcribed instructions can be cached. For example, in cases where code transcribed into the run buffer is repeatedly executed, the contents of the run buffer can be reused.

Thus, responsive to determining that the instructions to be traced are identical to the code that has already been transcribed into the run buffer, the run buffer can be reused by skipping instruction processing for the instructions and instead executing the run buffer again.

Example 20—Example Implementation

In any of the examples, a method of performing tracing can proceed as follows:

An input program comprising a plurality of executable instructions comprising memory access instructions, branch instructions, and other instructions is received. A plurality of the executable instructions are transcribed into a run buffer wherein the plurality of executable instructions comprise a particular memory access instruction.

An executable extraction instruction ensemble is injected into the run buffer, wherein injecting the ensemble comprises (a)-(c): (a) injecting one or more executable memory address extraction instructions based on the particular memory access instruction into the run buffer, wherein the executable memory address extraction instructions extract a memory location accessed by the particular memory access instruction; (b) injecting one or more executable pre-extraction instructions before the executable memory address extraction instructions into the run buffer, wherein the executable pre-extraction instructions preserve processor state; and (c) injecting one or more executable post-extraction instructions after the executable memory address extraction instructions into the run buffer, wherein the executable post-extraction instructions save the extracted memory location and restore processor state.

The run buffer is executed, wherein executing the run buffer executes the pre-extraction instructions, the extraction instructions, the post-extraction instructions, and the particular memory access instruction, thereby extracting the address accessed by the particular memory access instruction while preserving fidelity of execution of the input program.

The extracted address accessed by the particular memory access instruction can be stored to a log as described herein.

Example 21—Example Advantages

In any of the examples herein, a variety of advantages can result. For example, transcribing more than one instruction into the run buffer before executing the run buffer amortizes the overhead of observing execution across a plurality of instructions. Such batch tracing of instructions results in higher throughput for the instruction tracer. Conversely, single-step implementations (e.g., instruction trapping supported by hardware) can suffer from poor performance.

Because the input program itself is not modified (e.g., instructions are instead transcribed), multithreaded execution of the program can proceed on the original program without disruption (e.g., other threads are not impacted by tracing). Therefore, in practice, multiple threads can be traced at a time.

Employing a run buffer as described herein can include transcribing an original instruction, which preserves execution fidelity and computations equivalence to the original program. Therefore, high quality tracing data that represents accurate monitoring of execution can be collected.

Further, extraction instructions as described herein can leverage access to the processor and delegate some tracing tasks (e.g., computation of addresses) to the processor.

Because tracing can be orchestrated in software as described herein, the limitations of convention hardware implementations can be overcome.

Example 22—Example Computing Systems

Figure 8:
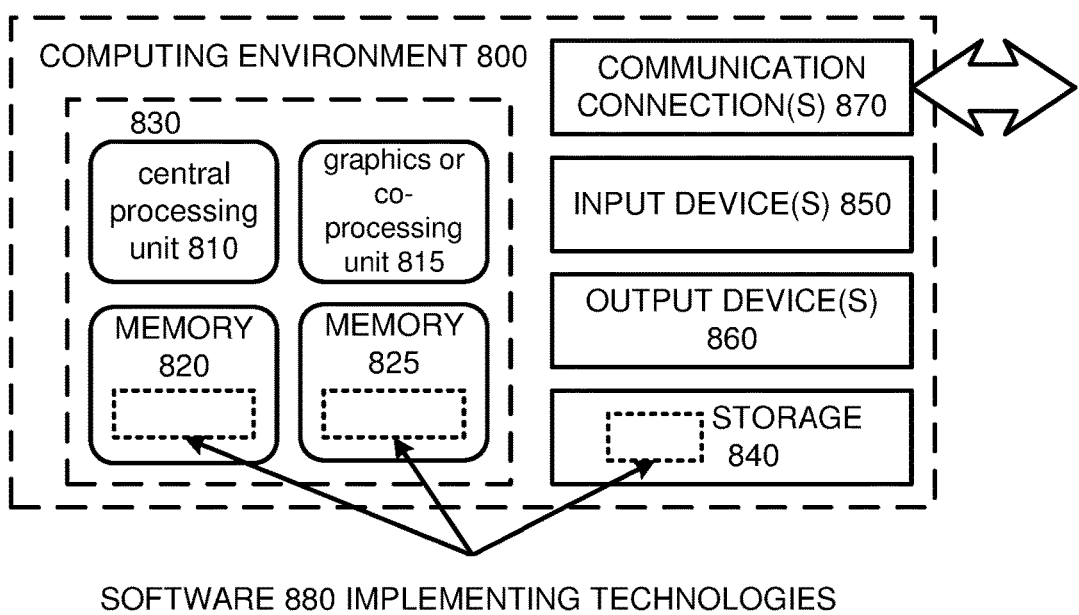
FIG. 8 is a diagram of an example computing system in which described embodiments can be implemented.

FIG. 8 illustrates a generalized example of a suitable computing system 800 in which several of the described innovations may be implemented. The computing system 800 is not intended to suggest any limitation as to scope of use or functionality, as the innovations may be implemented in diverse computing systems, including special-purpose computing systems. In practice, a computing system can comprise multiple networked instances of the illustrated computing system.

With reference to FIG. 8, the computing system 800 includes one or more processing units 810, 815 and memory 820, 825. In FIG. 8, this basic configuration 830 is included within a dashed line. The processing units 810, 815 execute computer-executable instructions. A processing unit can be a central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing system 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing system 800. For video encoding, the input device(s) 850 may be a camera, video card, TV tuner card, or similar device that accepts video input in analog or digital form, or a CD-ROM or CD-RW that reads video samples into the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 23—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Further Description

Any of the following embodiments can be implemented.

Clause 1. A computer-implemented method comprising:

for an input program comprising executable instructions, transcribing a plurality of the executable instructions into a run buffer, wherein the transcribing generates a transcribed executable instruction based on an original executable instruction of the input program; and executing the run buffer, wherein executing the run buffer comprises extracting execution information for the transcribed executable instruction in the run buffer, recording the execution information for the transcribed executable instruction, and executing the transcribed executable instruction.

Clause 2. One or more computer-readable media comprising computer-executable instructions that when executed cause a computing system to perform the method of Clause 1.

Clause 3. The method of Clause 1 further comprising:

injecting an executable extraction instruction ensemble into the run buffer;

wherein the executable extraction instruction ensemble performs the extracting and the recording when executed.

Clause 4. The method of any of Clauses 1 or 3 wherein:

the executable extraction instruction ensemble comprises an executable extraction instruction derived from the original executable instruction.

Clause 5. The method of Clause 4 further comprising:

generating the executable extraction instruction based on the original executable instruction.

Clause 6. The method of Clause 5 wherein:

the executable extraction instruction, when executed, generates a memory address accessed by the original executable instruction.

Clause 7. The method of any of Clauses 1 or 3-6 wherein:

the original executable instruction loads from or stores to a memory address; and extracting the execution information comprises extracting the memory address.

Clause 8. The method of Clause 7 further wherein:

generating the executable extraction instruction comprises generating one or more executable memory address extraction instructions based on the original executable instruction that, when executed, generate the memory address.

Clause 9. The method of Clause 8 wherein:

generating the one or more executable memory address extraction instructions comprises generating a load-effective-address instruction based on the original executable instruction.

Clause 10. The method of an of Clauses 8-9 further comprising:

injecting one or more executable pre-extraction instructions before the executable extraction instructions in the run buffer; and injecting one or more executable post-extraction instructions after the executable extraction instructions into the run buffer.

Clause 11. The method of Clause 10 wherein:

the pre-extraction and the post-extraction instructions store and restore processor state, thereby making execution of the executable extraction instructions transparent.

Clause 12. The method of any of Clauses 1 or 3-11 wherein:

the run buffer comprises a plurality of transcribed executable instructions from the input program; and executing the run buffer comprises executing the plurality of transcribed executable instructions.

Clause 13. The method of Clauses 1 or 3-12 wherein:

executing the run buffer comprises branching execution to a beginning of the run buffer.

Clause 14. The method of claim Clauses 1 or 3-13 further comprising:

processing a branch executable instruction of the input program, wherein processing the branch executable instruction comprises interpreting the branch executable instruction, determining a destination location to which execution branches, recording an entry indicative of the branch executable instruction, and directing tracing processing to the destination location.

Clause 15. A computing system comprising:

one or more hardware processors; and an instruction tracer receiving an input program and generating an execution log, wherein the instruction tracer comprises a run buffer and transcribes a plurality of executable instructions of the input program into the run buffer, injects an executable address extraction instruction into the run buffer, and executes the run buffer;

wherein the executable address extraction instruction extracts an address of a memory access by a transcribed executable instruction when executed, and the address is recorded in the execution log.

Clause 16. The system of Clause 15 further comprising:

a branch interpreter configured to process a branch executable instruction of the input program and redirect the instruction tracer to a branch address indicated by the branch executable instruction.

Clause 17. The system of any of Clauses 15-16 wherein:

the instruction tracer injects an executable extraction instruction ensemble in to the run buffer; and the executable extraction instruction ensemble comprises the executable address extraction instruction.

Clause 18. The system of any of Clauses 15-17 wherein:

the instruction tracer injects an instruction into the run buffer that records the extracted address when executed.

Clause 19. The system of any of Clauses 15-18 wherein:

the instruction tracer further injects, into the run buffer, one or more executable pre-extraction instructions before at least one of the executable address extraction instructions; and the instruction tracer further injects, into the run buffer, one or more executable post-extraction instructions after the at least one of the executable address extraction instructions.

Clause 20. One or more computer-readable media comprising computer-executable instructions that when executed cause a computing system to perform a method comprising:

receiving an input program comprising executable instructions comprising memory access instructions, branch instructions, and other instructions;

transcribing a plurality of the executable instructions into a run buffer wherein the plurality of executable instructions comprise a particular memory access instruction;

injecting an executable extraction instruction ensemble into the run buffer, wherein injecting the ensemble comprises (a)-(c):

(a) injecting one or more executable memory address extraction instructions based on the particular memory access instruction into the run buffer, wherein the executable memory address extraction instructions extract a memory location accessed by the particular memory access instruction;

(b) injecting one or more executable pre-extraction instructions before the executable memory address extraction instructions into the run buffer, wherein the executable pre-extraction instructions preserve processor state; and (c) injecting one or more executable post-extraction instructions after the executable memory address extraction instructions into the run buffer, wherein the executable post-extraction instructions save the extracted memory location and restore processor state;

executing the run buffer, wherein executing the run buffer executes the pre-extraction instructions, the extraction instructions, the post-extraction instructions, and the particular memory access instruction, thereby extracting an address accessed by the particular memory access instruction while preserving fidelity of execution of the input program; and storing the extracted address accessed by the particular memory access instruction to a log.

Clause 20. One or more computer-readable media comprising computer-executable instructions that when executed cause a computing system to perform any of the methods of Clauses 1 or 3-14.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. All that comes within the scope and spirit of the claims is therefore claimed.

What is claimed is:

1. A computer-implemented method comprising:
for an input program comprising executable instructions, transcribing a plurality of the executable instructions of the input program into a run buffer, wherein the transcribing generates a transcribed executable instruction of the input program based on an original executable instruction of the input program, the transcribing comprises modifying the original executable instruction into the transcribed executable instruction, and the transcribed executable instruction accesses a same memory location as the original executable instruction even though the transcribed executable instruction is executed at a location different from that of the original executable instruction;
executing the run buffer into which the transcribed executable instruction of the input program has been transcribed, wherein executing the run buffer comprises extracting execution information for the transcribed executable instruction in the run buffer, recording the execution information for the transcribed executable instruction, and executing the transcribed executable instruction of the input program in the run buffer.

2. One or more computer-readable volatile or nonvolatile memories comprising computer-executable instructions that when executed cause a computing system to perform the method of claim 1.

3. The method of claim 1 further comprising:
injecting an executable extraction instruction ensemble into the run buffer;
wherein the executable extraction instruction ensemble performs the extracting and the recording when executed.

4. The method of claim 3 wherein:
the executable extraction instruction ensemble comprises an executable extraction instruction derived from the original executable instruction.

5. The method of claim 4 further comprising:
generating the executable extraction instruction based on the original executable instruction.

6. The method of claim 5 wherein:
the executable extraction instruction, when executed, generates a memory address accessed by the original executable instruction.

7. The method of claim 1 wherein:
the original executable instruction loads from or stores to a memory address; and
extracting the execution information comprises extracting the memory address.

8. The method of claim 5 further wherein:
generating the executable extraction instruction comprises generating one or more executable memory address extraction instructions based on the original executable instruction that, when executed, generate the memory address.

9. The method of claim 8 wherein:
generating the one or more executable memory address extraction instructions comprises generating a load-effective-address instruction based on the original executable instruction.

10. The method of claim 8 further comprising:
injecting one or more executable pre-extraction instructions before the executable extraction instructions in the run buffer; and
injecting one or more executable post-extraction instructions after the executable extraction instructions into the run buffer.

11. The method of claim 10 wherein:
the pre-extraction and the post-extraction instructions store and restore processor state, thereby making execution of the executable extraction instructions transparent.

12. The method of claim 1 wherein:
the run buffer comprises a plurality of transcribed executable instructions from the input program; and
executing the run buffer comprises executing the plurality of transcribed executable instructions.

13. The method of claim 1 wherein:
executing the run buffer comprises branching execution to a beginning of the run buffer.

14. The method of claim 1 further comprising:
processing a branch executable instruction of the input program, wherein processing the branch executable instruction comprises interpreting the branch executable instruction, determining a destination location to which execution branches, recording an entry indicative of the branch executable instruction, and directing tracing processing to the destination location.

15. One or more computer-readable volatile or nonvolatile memories comprising computer-executable instructions that when executed cause a computing system to perform a method comprising:

receiving an input program comprising executable instructions comprising memory access instructions, branch instructions, and other instructions;

transcribing a plurality of the executable instructions into a run buffer wherein the plurality of executable instructions comprise a particular memory access instruction employing relative addressing, wherein transcribing comprises modifying a part of the particular memory address instruction to refer to a same memory location after transcription;

injecting an executable extraction instruction ensemble into the run buffer, wherein injecting the ensemble comprises (a)-(c):

(a) injecting one or more executable memory address extraction instructions based on the particular memory access instruction into the run buffer, wherein the executable memory address extraction instructions extract a memory location accessed by the particular memory access instruction;

(b) injecting one or more executable pre-extraction instructions before the executable memory address extraction instructions into the run buffer, wherein the executable pre-extraction instructions preserve processor state; and (c) injecting one or more executable post-extraction instructions after the executable memory address extraction instructions into the run buffer, wherein the executable post-extraction instructions save the extracted memory location and restore processor state;

executing the run buffer, wherein executing the run buffer executes the pre-extraction instructions, the extraction instructions, the post-extraction instructions, and the particular memory access instruction, thereby extracting an address accessed by the particular memory access instruction while preserving fidelity of execution of the input program; and storing the extracted address accessed by the particular memory access instruction to a log.

16. A computing system comprising:

one or more hardware processors;

memory coupled to the one or more hardware processors, wherein the memory stores computer-executable instructions that, when executed, cause the one or more hardware processors to perform a method comprising:

for an input program comprising executable instructions, transcribing a plurality of the executable instructions of the input program into a run buffer, wherein the transcribing generates a transcribed executable instruction of the input program based on an original executable instruction of the input program, the transcribing comprises modifying the original executable instruction into the transcribed executable instruction, and the transcribed executable instruction accesses a same memory location as the original executable instruction even though the transcribed executable instruction is executed at a location different from that of the original executable instruction;

executing the run buffer into which the transcribed executable instruction of the input program has been transcribed, wherein executing the run buffer comprises extracting execution information for the transcribed executable instruction in the run buffer, recording the execution information for the transcribed executable instruction, and executing the transcribed executable instruction of the input program in the run buffer.

* * * * *